J. S. COXEY.
RESCUE FLOAT.
APPLICATION FILED AUG. 11, 1913.
1,184,325.
Patented May 23, 1916.
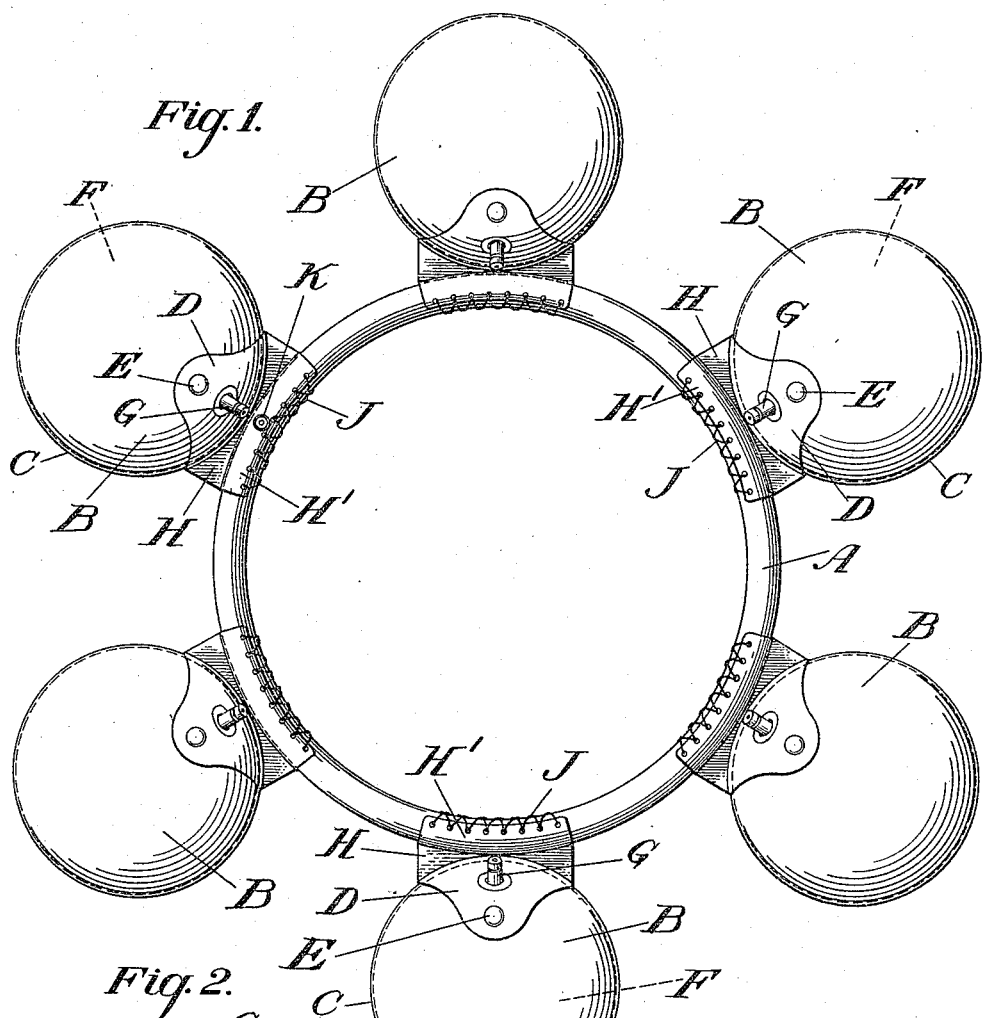
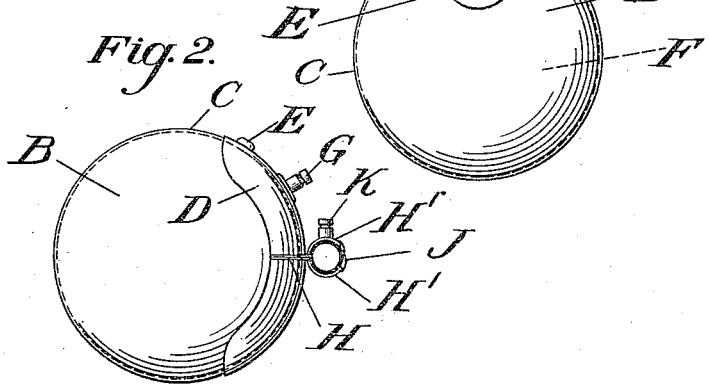
Witnesses:
John Darby
H. Muchmore
Jacob S. Coxey, Inventor
By his Attorney

UNITED STATES PATENT OFFICE.

JACOB S. COXEY, OF MASSILLON, OHIO.

RESCUE-FLOAT.

1,184,325.  Specification of Letters Patent.  Patented May 23, 1916.

Application filed August 11, 1913. Serial No. 784,022.

*To all whom it may concern:*

Be it known that I, JACOB S. COXEY, a citizen of the United States, residing in the city of Massillon, county of Stark, State of Ohio, have made certain new and useful Inventions in Rescue-Floats, of which the following is a specification, reference being had to the accompanying drawings, forming a part hereof.

My invention refers to rescue floats and more particularly to that class which are suitable in cases where to-day life belts and other devices are being used without any particular adaptability for the service.

Among the objects of my invention one is to produce an article of the kind which for a given size will support a maximum number of people in the water, that will be relatively more compact than devices now used for the purpose, that will be reliable and not become unserviceable when partially injured, and that may be handled more advantageously than anything now made, and when not in use may be transported in a collapsible or deflated condition presenting the least possible bulk and weight.

As a specific form of my invention I will hereafter describe a construction consisting of a tubular inflated ring to which a plurality of collapsible buoys are detachably connected, as shown in the accompanying drawings, in which—

Figure 1 is a plan view of the particular form of rescue float; Fig. 2 is a side view of one of the buoys or balloons with a connecting or common ring shown in section.

In the drawings A is the pneumatic supporting tube or ring, B—B—B are the buoys which consist of the casing C, having a flap D to close the opening into the casing C, with a snap fastening E, while inside the casing C is a rubber bladder F, with an inflating valve G. Securing flaps H sewed to the casing C have lips or extensions H' H', which are laced together by lacing J around the supporting ring A.

The supporting ring has an inflating valve K which is preferably located where the flaps H' on one of the buoys surround the tube, and may project through the flap H', as shown in Fig. 2, or the valve K may be made short and flat and covered entirely and protected by the flap H'. In the form illustrated it will be seen that six buoys are attached to one inflated or pneumatic ring. These buoys comprising the canvas casing C and the interior light rubber bladder F, provide for a maximum of buoyancy with lightness of material and toughness in the protecting canvas in order to withstand the usage which a life float or rescue float of this character is subjected. By placing the inflating valve of the main ring on one side, there is no protrusion radially inward from the inflated ring to interfere with use of the rescue belt when being handled.

It is well known that rescue belts of any kind should be adapted to be thrown from ship or from shore, and also to be readily carried in the water as well as out of the water. My device is particularly suitable to be thrown over the shoulder, and then when in the water when it floats and moves with the motion of the swimmer, there is no chance of his being lacerated as he might be by an inwardly protruding valve, while in every other respect any injury or danger of any character is avoided in the use of the device by the construction I have devised.

In case of deflation of any one or several of the buoys, it will be seen that the common or main ring still, being inflated, will float and afford a substantial support in the water for any one clinging to it. By attaching the buoys at intervals the intermediate spaces on the ring afford a handhold for six hands, in the form illustrated, and as many more as the size of the device will permit.

By the arrangement and construction it will be seen that a great amount of buoyancy is afforded with a minimum of weight resulting from the use of the light bladders or inflated rubber, while the device as a whole spreads over a considerable area of water when in use, thereby becoming far more accessible than a single inflated ring or a single inflated tank, which represent the improvised devices now being used in emergency for the purpose of which my invention is intended.

In case of injury to the wellknown form of life belt now commonly used at bathing resorts or on board ships, an injury to the article necessitates eventually the renewal of the entire device, while in some constructions a slight injury in the nature of a puncture of an air-tight metallic tank, would incapacitate the whole device for use. On the contrary in my device the liability to injury is extremely small, because the puncturing of one or more bladders would still leave ample buoyancy for immediate use, in addition to which the complete repair of the device would consist solely in the replacement of one or more of the buoys, namely, those that have been injured. Therefore any injury can always be replaced at a small fraction of the cost of the new device, whereas in other heretofore known life belts or rescue belts the complete device must be replaced.

It will be seen that many advantages residing in my invention may be obtained in various embodiments and modifications in the shape of the buoys and in their number and arrangement and in the relative sizes of the buoys, and otherwise may be made without departing from the spirit of my invention, but

What I claim and desire to secure by Letters Patent is:

A rescue float consisting of a combination of individually buoyant members, comprising a plurality of independently inflatable buoyant members each adapted for substantial support for a person, an inflatable, circular, tubular, individually buoyant member, means for detachably securing each of the first mentioned buoyant members to the ring, and a bag of non-stretchable material inclosing each of the first-named buoyant members and being integral with part of the attaching means, as and for the purpose described.

In testimony whereof, I have signed my name to this specification, in the presence of two subscribing witnesses, this 9th day of August, 1913.

JACOB S. COXEY.

Witnesses:
HERMANN F. CUNTZ,
H. D. DABNEY.

Copies of this patent may be obtained for five cents each, by addressing the "Commissioner of Patents, Washington, D. C."